(12) United States Patent
Ahn et al.

(10) Patent No.: US 10,939,385 B2
(45) Date of Patent: Mar. 2, 2021

(54) UPLINK TRANSMISSION POWER CONTROL METHOD AND DEVICE USING SAME

(71) Applicant: LG Electronics Inc., Seoul (KR)

(72) Inventors: Joonkui Ahn, Seoul (KR); Jaehyung Kim, Seoul (KR); Suckchel Yang, Seoul (KR); Changhwan Park, Seoul (KR); Yunjung Yi, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/494,892

(22) PCT Filed: Mar. 16, 2018

(86) PCT No.: PCT/KR2018/003080
§ 371 (c)(1),
(2) Date: Sep. 17, 2019

(87) PCT Pub. No.: WO2018/182213
PCT Pub. Date: Oct. 4, 2018

(65) Prior Publication Data
US 2020/0037261 A1 Jan. 30, 2020

Related U.S. Application Data

(60) Provisional application No. 62/479,300, filed on Mar. 30, 2017, provisional application No. 62/501,045, (Continued)

(51) Int. Cl.
*H04W 52/24* (2009.01)
*H04W 52/14* (2009.01)
*H04W 52/36* (2009.01)

(52) U.S. Cl.
CPC ......... *H04W 52/24* (2013.01); *H04W 52/146* (2013.01); *H04W 52/365* (2013.01); *H04W 52/367* (2013.01)

(58) Field of Classification Search
CPC ............. H04W 52/146; H04W 52/367; H04W 52/365; H04W 72/0413; H04W 72/085; H04W 52/04; H04W 52/24
See application file for complete search history.

(56) References Cited

U.S. PATENT DOCUMENTS

2016/0242206 A1  8/2016 Ohlsson et al.
2016/0353440 A1* 12/2016 Lee ................... H04W 72/0453
(Continued)

FOREIGN PATENT DOCUMENTS

| WO | 2016163734 | 10/2016 |
| WO | 2016166937 | 10/2016 |
| WO | 2016183025 | 11/2016 |

OTHER PUBLICATIONS

Samsung, "MIB Contents for Low Cost UEs," R1-151595, 3GPP TSG RAN WG1 #80bis, Belgrade, Serbia, Apr. 10, 2015, see section 2.

*Primary Examiner* — Keith Ferguson
(74) *Attorney, Agent, or Firm* — Dentons US LLP

(57) ABSTRACT

Provided are a method for controlling uplink transmission power and a device using the same. The device determines a maximum transmission power according to a coverage enhancement (CE) level, and transmits an uplink channel on the basis of the maximum transmission power.

10 Claims, 3 Drawing Sheets

Related U.S. Application Data filed on May 3, 2017, provisional application No. 62/522,104, filed on Jun. 20, 2017.

(56) References Cited

U.S. PATENT DOCUMENTS

2017/0238266 A1* 8/2017 Frank ................ H04W 72/0413
　　　　　　　　　　　　　　　　　　　　　　370/329
2017/0290001 A1* 10/2017 Axmon ................... H04W 4/70
2018/0160448 A1* 6/2018 Blankenship ..... H04W 74/0833

* cited by examiner

UPLINK TRANSMISSION POWER CONTROL METHOD AND DEVICE USING SAME

This application is the National Stage filing under 35 U.S.C. 371 of International Application No. PCT/KR2018/003080, filed on Mar. 16, 2018, which claims the benefit of U.S. Provisional Application Nos. 62/479,300 filed on Mar. 30, 2017, No. 62/501,045 filed on May 3, 2017 and No. 62/522,104 filed on Jun. 20, 2017 the contents of which are all hereby incorporated by reference herein in their entirety.

FIELD

The present invention relates to wireless communication, and more particularly, to a method for controlling uplink transmit power in a wireless communication system, and a device using the method.

RELATED ART

Internet of things (IoT) is a technique in which various objects including human beings transmit data through a network without human interaction.

A narrowband (NB)-IoT standardization is introduced in the 3rd generation partnership project (3GPP) to provide IoT connectivity. 3GPP LTE supports a bandwidth of at least 20 MHz. It is expected that the NB-IoT supports a bandwidth of 180 kHz or higher than that.

The NB-IoT supports three operation modes, i.e., in-band, guard band, and stand-alone. The in-band mode operates by allocating some of resources within a long-term evolution (LTE) band to the NB-IoT. The guard band mode utilizes an LTE guard band. The stand-alone mode operates by allocating some carriers within a Global System for Mobile communication (GSM) band.

A device supporting NB-IoT is placed indoors, and thus may experience a higher path loss in comparison with other mobile devices. In order to overcome a poor propagation environment, it is required to increase transmit power of the NB-IoT device. However, higher transmit power may cause interference to other devices.

SUMMARY

The present invention provides a method for controlling uplink transmit power in a wireless communication system, and a device using the method.

In an aspect, a method for controlling uplink transmit power in a wireless communication system is provided. The method includes receiving, by a wireless device, a coverage enhancement (CE) configuration for CE, wherein the CE configuration includes information on at least one CE threshold for determining CE levels and a maximum transmit power applied at each CE level, acquiring, by the wireless device, a measurement value based on a received downlink signal, determining, by the wireless device, a CE level based on the measurement value and the at least one CE threshold, and transmitting, by the wireless device, an uplink channel based on the maximum transmit power for the determined CE level.

In another aspect, a device for controlling uplink transmit power in a wireless communication system includes a transceiver configured to transmit and receive a radio signal, and a processor operatively coupled to the transceiver. The processor is configured to control the transceiver to receive a coverage enhancement (CE) configuration for CE, wherein the CE configuration includes information on at least one CE threshold for determining CE levels and a maximum transmit power applied at each CE level, acquire a measurement value based on a received downlink signal, determine a CE level based on the measurement value and the at least one CE threshold, and control the transceiver to transmit an uplink channel based on the maximum transmit power for the determined CE level.

Interference between wireless devices can be reduced in uplink transmission.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device or an internet of things (IoT) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS). However, this is for exemplary purposes only, and thus the present invention is also applicable to various wireless communication networks.

Narrowband-Internet of Things (NB-IoT) is a system which supports a narrower bandwidth within a bandwidth of 3GPP LTE. The 3GPP LTE has a subcarrier spacing of 15 kHz, and supports a bandwidth of at least 20 MHz. The NB-IoT may have a subcarrier spacing of 15 kHz or 3.75 kHz or smaller than that. The NB-IoT may support a bandwidth of 3 kHz or higher than that. This is only an embodiment, and proposed embodiments are applicable to a wireless communication network supporting various bandwidths.

In the 3GPP LTE, downlink (DL)/uplink (UL) scheduling is achieved on a subframe basis. The subframe includes a plurality of orthogonal frequency division multiplexing (OFDM) symbols, and a transmission time interval (TTI) is a time required to transmit one subframe. 1 TTI may be 1ms. One subframe includes 14 OFDM symbols in a normal cyclic prefix (CP), and one subframe includes 12 OFDM symbols in an extended CP.

In the 3GPP-based NB-IoT, a DL physical channel includes a narrowband physical broadcast channel (NPBCH), a narrowband physical downlink shared channel (NPDSCH), and a narrowband physical downlink control channel (NPDCCH). A physical signal includes a narrowband reference signal (NRS), a narrowband primary synchronization signal (NPSS), and a narrowband secondary synchronization signal (NSSS).

Figure 1:
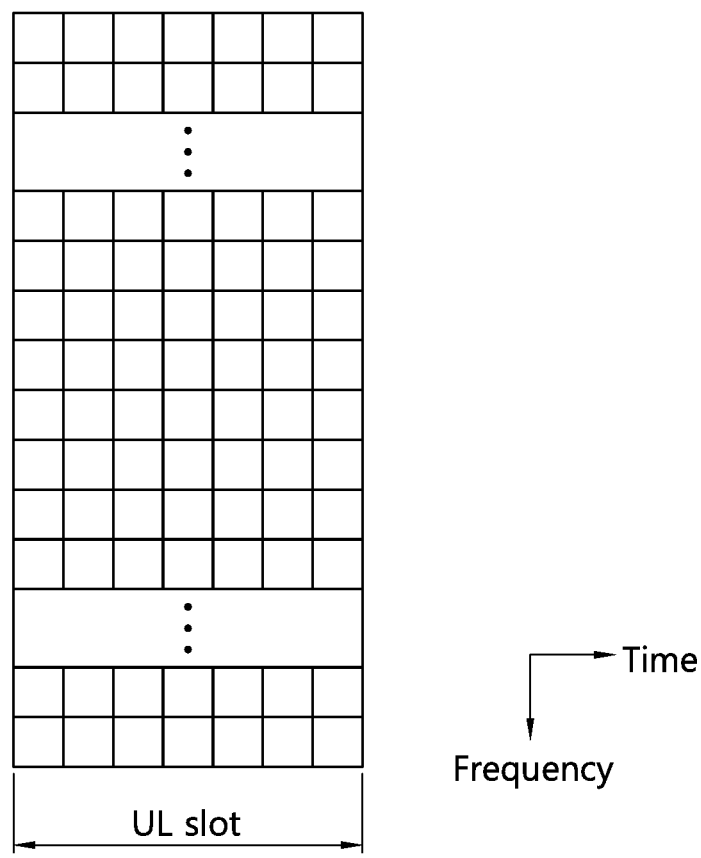
FIG. 1 shows a structure of an uplink slot in NB-IoT.

FIG. 1 shows a structure of an uplink slot in NB-IoT.

In NB-IoT, UL transmission supports two subcarrier spacings of 15 kHz and 3.75 kHz. The UL transmission is based on a slot including 7 orthogonal frequency division multiplexing (OFDM) symbols. One radio frame includes 20 slots in the subcarrier spacing of 15 kHz, and one radio frame includes 5 slots in the subcarrier spacing of 3.75 kHz. In a time domain, one slot has a length of 0.5 ms in the subcarrier spacing of 15 kHz, and one slot has a length of 2 ms in the subcarrier spacing of 3.75 kHz. In a frequency domain, one slot includes 48 subcarriers in the subcarrier spacing of 15 kHz, and one slot includes 12 subcarriers in the subcarrier spacing of 3.75 kHz.

A resource unit is a basic unit for NPUSCH transmission. The NPUSCH is transmitted by being mapped to one or more resource units. The resource unit is defined as Nslot slots in the time domain and Nsc subcarriers in the frequency domain.

TABLE 1

| NPUSCH format | subcarrier spacing | Nsc | Nslot |
|---|---|---|---|
| 1 | 3.75 kHz | 1 | 16 |
|  | 15 kHz | 1 | 16 |
|  |  | 3 | 8 |
|  |  | 6 | 4 |
|  |  | 12 | 2 |
| 2 | 3.75 kHz | 1 | 4 |
|  | 15 kHz | 1 | 4 |

An NPUSCH format 1 is used to carry UL user data, and a PUSCH format 1 is used to carry UL control information (e.g., HARQ ACK/NACK).

The NPRACH is transmitted based on a single-subcarrier frequency-hopping symbol group. A resource configuration for the NPRACH includes the number of times of performing repetitive transmission, an NPRACH resource period, a position of a first subcarrier for the NPRACH, and an NPRACH transmission start time.

Figure 2:
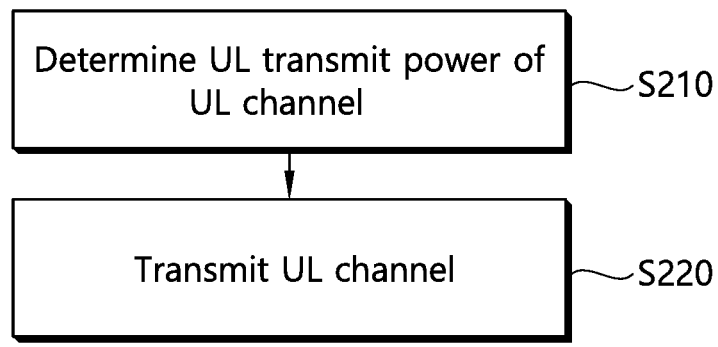
FIG. 2 is a flowchart showing a method of controlling UL transmit power according to an embodiment of the present invention.

FIG. 2 is a flowchart showing a method of controlling UL transmit power according to an embodiment of the present invention.

In step S210, a wireless device determines UL transmit power of a UL channel In step S220, the wireless device transmits the UL channel on the basis of the UL transmit power.

UL transmit power PNPUSCH for the NPUSCH at a slot i for a serving cell c may be determined such as $P_{NPUSCH}$=min {Pcmax, 10 $\log_{10}$M+P(j)+α(j)PL}. Herein, Pcmax is maximum UL transmit power configured at the slot i for the serving cell, and P(j) and α(j) are parameters. PL is an estimated DL path loss calculated by the wireless device. M is {1/4} in a subcarrier spacing of 3.75 kHz, and is {1, 3, 6, 12} in a subcarrier spacing of 15 kHz.

UL transmit power PNPRACH for the NPRACH may be determined as $P_{NPRACH}$=min{Pcmax, NPRTP+PL}. The NPRTP is a parameter provided for NPRACH transmission from the serving cell.

A parameter Pcmax used to determine the UL transmit power refers to maximum transmit power configured for the wireless device, and is used by a BS to decrease interference by adjusting the maximum UL transmit power of wireless devices in a cell. Pcmax is given by RRC signaling after a radio resource control (RRC) connection is established between the wireless device and the BS. However, if UL transmission of a device placed indoors, such as an NB-IoT device, is also limited by Pcmax, an error of UL transmission may occur due to a poor propagation environment.

In order to prevent the error of UL transmission, the BS may transfer to the wireless device an allowance indicator indicating whether the transmit power of the UL channel (e.g., NPUSCH, NPRACH) can be determined to be greater than Pcmax.

Alternatively, the BS may inform the wireless device of the maximum transmit power for the NPUSCH/NPRACH (this is referred to as second maximum transmit power) separately from Pcmax (this is referred to as first maximum transmit power). That is, the second maximum transmit power for an NB-IoT UL channel which uses a small bandwidth may be configured independently of the first maximum transmit power for an LTE UL channel which uses a great bandwidth.

Narrowband power information includes at least any one of the allowance indicator and the second maximum transmit power. The narrowband power information is information used to determine the transmit power for the UL channel transmitted at a bandwidth smaller than 20 MHz.

The narrowband power information may be transferred through cell-specific signaling as common system information, or may be transmitted through UE-specific signaling. The narrowband power information may be included in a random access response during a random access procedure.

The narrowband power information may be provided for each coverage enhancement (CE) level or repetition count or CE level group applied to UL transmission. Alternatively, the narrowband power information may be used to determine the transmit power of the UL channel to which a CE level higher than a specific CE level is applied.

The Pcmax or the narrowband power information cannot be applied until the wireless device establishes an RRC connection. Therefore, the narrowband power information cannot be applied to the NPRACH or NPUSCH transmitted before the RRC connection is established. In addition, when the wireless device disconnects the RRC connection with a current cell, the Pcmax and the narrowband power information are discarded, and the narrowband power information cannot be applied until the RRC connection is established with another cell. In an embodiment, when the RRC connection is established with a specific cell and the narrowband power information is configured, the wireless device may maintain previous narrowband power information until the RRC connection is established and apply it to UL transmission even after the RRC connection with the specific cell is disconnected. In another embodiment, the narrowband power information may be configured in a network entity (e.g., mobility management entity (MME)) which manages mobility, together with a mobility configuration. Therefore, even if the cell is changed, the narrowband power information of the wireless device may be continuously maintained, and the narrowband power information may be applied to UL transmission even if the RRC connection is disconnected.

An NPRACH/NPUSCH resource (e.g., a subframe, a subcarrier, etc.) to which the narrowband power information is applicable may be additionally designated. When NPRACH/NPUSCH transmission is allocated to a resource to which the narrowband power information is applicable, the wireless device may determine transmit power of the NPRACH/NPUSCH on the basis of the narrowband power information.

The narrowband power information may be transferred dynamically. The narrowband power information may be provided through a physical control channel for scheduling the NPRACH transmission. When the NPRACH scheduling and the narrowband power information are provided on the physical control channel, the wireless device may determine the transmit power of the NPRACH on the basis of the narrowband power information.

Assume that the transmit power for the NPRACH/NPUSCH is set to be able to exceed Pcmax. This is a case where an allowance indicator can determine the transmit power of the NPUSCH/NPRACH to be greater than Pcmax or second maximum transmit power is set for the NPUSCH/NPRACH. The wireless device may apply the transmit power exceeding Pcmax when a repetition count of the NPRACH/NPUSCH is greater than or equal to a specific value. This is to allow the UL transmit power to be able to exceed Pcmax when the wireless device has insufficient coverage, although inter-cell interference is reduced basically by allowing UL transmit power not to exceed Pcmax. The specific value may be provided to the wireless device through signaling or may be a predetermined value. The specific value may be set to the same value as the maximum repetition count allowed to the wireless device or the cell.

More specifically, assume that the specific value is 2. Upon indicating that the repetition count is 2 through the physical control channel for scheduling NPRACH transmission, the NPRACH can be transmitted since it exceeds Pcmax. Alternatively, if the repetition count of the NPRACH is less than 2, the wireless device determines transmit power of the NPRACH on the basis of Pcmax. The transmit power exceeding Pcmax may be allowed if a random access response is not received after the NPRACH is transmitted and if the repetition count is greater than 2.

In general, upon failing in reception of a random access response for the NPRACH, the NPRACH is retransmitted while increasing transmit power by a power ramping factor (this is referred to as a first power ramping factor). If the NPRACH repetition count is greater than or equal to a specific value and the reception of the random access response fails, the wireless device may determine the transmit power of the NPRACH as follows. In an embodiment, upon failing in the reception of the random access response for the NPRACH transmitted based on Pcmax, the wireless device may transmit a next NPRACH on the basis of the set second maximum transmit power. In another embodiment, upon failing in the reception of the random access response for the NPRACH transmitted based on Pcmax, the wireless device may transmit the next NPRACH on the basis of min(the set second maximum transmit power, Pcmax+f2). Herein, f2 is a second power ramping factor. In another embodiment, upon failing in the reception of the random access response for the NPRACH transmitted based on Pcmax, the wireless device may transmit the next NPRACH on the basis of min(the set second maximum transmit power, f2). The second power ramping factor may be equal to or greater than the first power ramping factor. The second power ramping factor may be predetermined or may be provided to the wireless device through signaling.

If the random access response is not received even though the NPRACH is transmitted with maximum transmit power exceeding Pcmax at the first repetition count, the wireless device may transmit the NPRACH at the second repetition count as follows. In an embodiment, the wireless device transmits the NPRACH on the basis of second maximum transmit power at the second repetition count. In another embodiment, the wireless device may first transmit the NPRACH on the basis of Pcmax at the second repetition count. If the random access response is not received again, the wireless device transmits the NPRACH on the basis of the second maximum transmit power.

As shown in Table 1, the NPUSCH is transmitted through one or more subcarriers. However, the NPRACH is transmitted through one subcarrier. The transmit power of the NPRACH may be determined based on the second maximum transmit power only for an NPRACH resource associated with NPUSCH transmission using one subcarrier (this is referred to as single tone PUSCH transmission). A first NPRACH resource for single-tone PUSCH transmission and a second NPRACH resource for multi-tone PUSCH transmission may be configured. A single-tone PUSCH is used by a transmission device which requires great transmit power primarily due to a far distance from a BS or a poor channel environment. Therefore, transmit power greater than Pcmax may be applied to NPRACH transmission associated with single-tone PUSCH transmission.

When a plurality of carriers (or a plurality of serving cells) are configured for the wireless device, narrowband transmit power information may be given to each of the plurality of carriers. The wireless device may transmit the NPRACH preferentially on a carrier for which the transmit power greater than Pcmax is possible. If the NPRACH is transmitted on a carrier for which the transmit power greater than Pcmax is not allowed and if the random access response is not received, the wireless device may reattempt NPRACH retransmission by moving to the carrier for which the transmit power greater than Pcmax is possible. The carrier for which the transmit power greater than Pcmax is possible may be a non-anchor carrier.

In order to apply the transmit power greater than Pcmax, the following scheme is proposed. In an embodiment, the BS may inform the wireless device of an offset value against Pcmax of NPUSCH transmit power through UL scheduling information or another signaling. In another embodiment, if last NPRACH transmit power is greater than Pcmax, the wireless device may apply an offset value to the last NPRACH transmit power in subsequent PUSCH transmission. The BS may inform the wireless device of the offset value through a random access response or another signaling.

In order for the wireless device to apply the transmit power greater than Pcmax in NPRACH/NPUSCH transmission, it may be limited to a case where the following conditions are satisfied. In a first case, a measurement result (e.g., reference signal received power (RSRP), reference signal received quality (RSRQ), path loss value) is less than or equal to a specific level. In a second case, second maximum transmit power is greater by a specific offset than Pcmax.

Coverage enhancement (CE) is used to support a device which undergoes a significant path loss by considering an environment in which various IoT/MTC devices are installed. A CE level is determined based on a CE threshold given by the BS. For example, when three CE levels (e.g., CE0, CE1, CE2) are supported, the BS may provide two CE thresholds (e.g., CEThreshold1, CEThreshold2). The wireless device acquires a measurement value on the basis of a DL signal (e.g., NPSS, NSSS, NPBCH, etc.). The measurement value may include reference signal received power (RSRP), reference signal received quality (RSRQ), and/or received signal strength indicator (RSSI). If the measurement value is less than CEThreshold2, CE2 is configured, and if the measurement value is greater than or equal to CEThreshold2 and less than CEThreshold1, CE1 is configured. Otherwise, CE0 is configured. For each CE level, the CE configuration may be defined as shown in the following table.

TABLE 2

| Name | Description |
|---|---|
| Maximum transmit power | Maximum UL transmit power applied at corresponding CCE level |
| NPRACH repetition | The number of times of repeatedly transmitting NPRACH at corresponding CE level |

The wireless device may transmit the UL channel based on the maximum transmit power set at the CCE level.

In the above embodiment, Pcmax may be referred to as the maximum UL transmit power given to the NB IoT device. This is because a wireless device operating only in the narrow band may not receive both the first maximum transmit power given in the wide band and the second maximum transmit power given in the narrow band.

Figure 3:
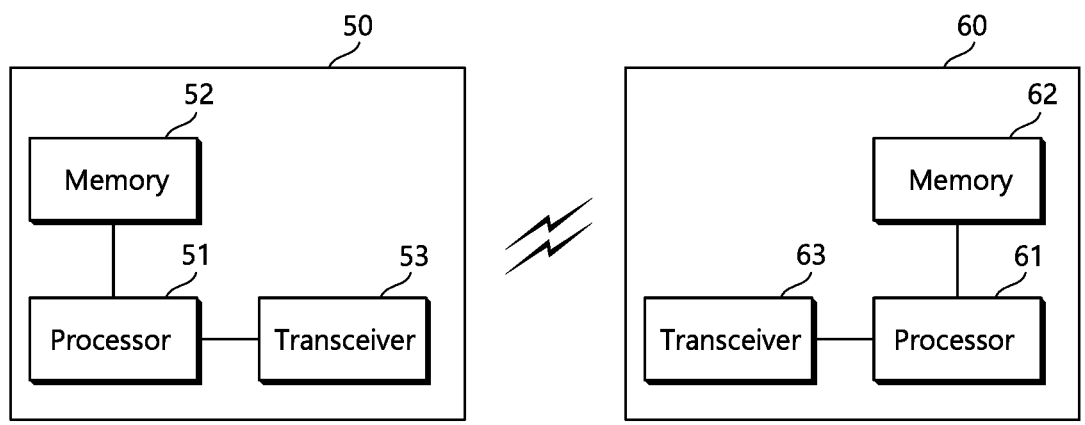
FIG. 3 is a block diagram showing a wireless communication system for implementing an embodiment of the present invention.

FIG. 3 is a block diagram showing a wireless communication system for implementing an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the wireless device may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for controlling uplink transmit power in a wireless communication system, the method comprising:
   receiving, by a wireless device, a coverage enhancement (CE) configuration for CE, wherein the CE configuration includes information on at least one CE threshold for determining CE levels and a maximum transmit power applied at each CE level;
   acquiring, by the wireless device, a measurement value based on a received downlink signal;
   determining, by the wireless device, a CE level based on the measurement value and the at least one CE threshold; and
   transmitting, by the wireless device, an uplink channel based on the maximum transmit power for the determined CE level,
   wherein the at least one CE threshold includes a first CE threshold and a second CE threshold, and
   wherein determining the CE level includes:
   determining the CE level as a third CE level based on the measurement value being less than the second CE threshold;
   determining the CE level as a second CE level based on the measurement value being greater than or equal to the second CE threshold and less than the first CE threshold; and
   determining the CE level as a first CE level based on the measurement RSRP being greater than or equal to the first CE threshold.

2. The method of claim 1, wherein the uplink channel includes at least one of a narrowband physical uplink shared channel (NPUSCH) and a narrowband physical random access channel (NPRACH).

3. The method of claim 1, wherein the uplink channel is transmitted in one resource block including 12 subcarriers.

4. The method of claim 1, wherein the uplink channel is transmitted repeatedly over a plurality of slots.

5. The method of claim 1, wherein the measurement value includes any one of reference signal received power (RSRP), reference signal received quality (RSRQ), and received signal strength indicator (RSSI).

6. A device for controlling uplink transmit power in a wireless communication system, the device comprising:
   a transceiver configured to transmit and receive a radio signal; and
   a processor operatively coupled to the transceiver and configured to:
   control the transceiver to receive a coverage enhancement (CE) configuration for CE, wherein the CE configuration includes information on at least one CE threshold for determining CE levels and a maximum transmit power applied at each CE level;
   acquire a measurement value based on a received downlink signal;
   determine a CE level based on the measurement value and the at least one CE threshold; and
   control the transceiver to transmit an uplink channel based on the maximum transmit power for the determined CE level,
   wherein the at least one CE threshold includes a first CE threshold and a second CE threshold, and
   wherein the processor is configured to determine the CE level as a third CE level based on the measurement value being less than the second CE threshold, determine the CE level as a second CE level based on the measurement value being greater than or equal to the second CE threshold and less than the first CE threshold, and determine the CE level as a first CE level based on the measurement RSRP being greater than or equal to the first CE threshold.

7. The device of claim 6, wherein the uplink channel includes at least one of a narrowband physical uplink shared channel (NPUSCH) and a narrowband physical random access channel (NPRACH).

8. The device of claim 6, wherein the uplink channel is transmitted in one resource block including 12 subcarriers.

9. The device of claim 6, wherein the uplink channel is transmitted in one resource block including 12 subcarriers.

10. The device of claim 6, wherein the measurement value includes any one of reference signal received power (RSRP), reference signal received quality (RSRQ), and received signal strength indicator (RSSI).

* * * * *